United States Patent [19]

Nakamura

[11] Patent Number: 5,112,631
[45] Date of Patent: May 12, 1992

[54] METHOD OF CONTINUOUSLY PRODUCING STRUDELS CONTAINING CAKE OR CAKE AND A FILLING

[75] Inventor: Yasuhiro Nakamura, Utsumomiya, Japan

[73] Assignee: Rheon Automatic Machinery Co., Ltd., Tochigi, Japan

[21] Appl. No.: 472,384

[22] Filed: Jan. 31, 1990

[30] Foreign Application Priority Data

Feb. 2, 1989 [JP] Japan ................................. 1-24642

[51] Int. Cl.⁵ ............................................ A21D 13/08
[52] U.S. Cl. ................................. 426/297; 426/500; 426/502
[58] Field of Search ............... 426/297, 391, 496, 500, 426/502, 94, 103, 283, 284

[56] References Cited

U.S. PATENT DOCUMENTS

| | | | |
|---|---|---|---|
| 1,975,326 | 10/1934 | Loose et al. | 426/502 |
| 3,198,637 | 8/1965 | Harris et al. | 426/249 |
| 3,250,625 | 5/1966 | Thelen | 426/103 |
| 3,250,627 | 5/1966 | Thelen | 426/94 |
| 4,416,910 | 11/1983 | Hayashi et al. | 426/502 |
| 4,418,085 | 11/1983 | Becquelet | 426/297 |
| 4,455,333 | 6/1984 | Hong et al. | 426/496 |
| 4,526,795 | 7/1985 | Wolf | 426/297 |
| 4,842,879 | 6/1989 | Ek | 426/297 |
| 4,955,801 | 9/1990 | Kessler et al. | 99/450.1 |

FOREIGN PATENT DOCUMENTS

2522933 9/1983 France ................................ 426/297

OTHER PUBLICATIONS

Woman's Day, Encyclopedia of Cookery, vol. 11, 1966, pp. 1779-1780, Strudel Recipe.

Primary Examiner—Arthur L. Corbin
Attorney, Agent, or Firm—Finnegan, Henderson, Farabow, Garrett & Dunner

[57] ABSTRACT

A method of continuously producing strudels containing cake is provided, by which cake dough is continuously enveloped by a continuous pastry dough sheet to form a continuous pastry dough body containing cake dough, which body is cut into pastry dough pieces containing cake dough, which are then baked to form strudels containing cake, or preserved in a frozen condition to serve the instantaneous needs of the consumer. A method of continuously producing strudels containing cake and a filling is also provided, by which cake and a filling are continuously enveloped with a continuous pastry dough sheet to form a continuous pastry dough body containing cake dough and a filling, which body is cut into pastry dough pieces containing cake and a filling, which are then baked to form strudels containing cake and a filling, or preserved in a frozen condition. As a result, strudels containing the cake, or a cake and filling, and with high and stable qualities, and low production costs, are obtained.

16 Claims, 4 Drawing Sheets

METHOD OF CONTINUOUSLY PRODUCING STRUDELS CONTAINING CAKE OR CAKE AND A FILLING

BACKGROUND OF THE INVENTION

1. Field of Invention

This invention relates to a method of producing strudels containing an inner material, and more particularly, to a method of continuously producing strudels containing cake, or cake and a filling.

2. Description of Prior Art

Strudels that contain only a filling have been continuously produced by enveloping a continuously extruded filling by a continuous sheet of pastry dough to form a continuous pastry dough body containing a filling, cutting the pastry dough body into pastry dough pieces containing the filling, and baking them. For strudels that contain cake, or cake and a filling, the baking requirements for raw cake dough differ from those for baking pastry dough. Namely, the best condition to bake just raw cake dough alone, which condition has been customarily adopted in bakeries, is to do so for about 45 minutes at about 177° C., and the best condition to bake the pastry dough alone, and which condition has been customarily adopted in bakeries, is to do so for about 20 minutes at about 204° C. Therefore, it has been thought by those skilled in the art that it would be difficult to bake pastry dough together with the raw cake dough, at one time, to make strudels that contain cake, or cake and a filling. Therefore, for instance, before now strudels that contain cake have been produced by enveloping pieces of cake previously baked for about 45 minutes at about 177° C. with pieces of pastry dough, and baking them a second time, usually for from about 25 to 35 minutes at a temperature ranging from about 177° C. to 190° C. Thus, because the cake is twice baked, and so it tends to be excessively baked, the quality of the strudels tends to be lowered. Further, since strudels containing cake, or cake and a filling, have been manually produced, the quality of the strudels has been unstable, and their production costs have been high because of their complex manufacturing processes.

SUMMARY OF THE INVENTION

It is therefore an object of this invention to provide a method by which raw cake dough is continuously enveloped by a continuous pastry dough sheet to form a pastry dough body containing raw cake dough, and then to cut and bake it in a condition wherein the pastry dough is baked together with the raw cake dough, thereby obtaining strudels containing cake, while avoiding the excessive baking of cake dough pieces, due to their double baking, once before and once after, they are enveloped by pastry dough pieces, to produce stable and good quality strudel products, and to simplify the production process, thereby lowering production costs. The applicant conducted many experiments to find a condition to bake the pastry dough together with the raw cake dough, at one time. As a result, it has been found that a preferable condition for baking is for from about 20 to 25 minutes at a temperature ranging from about 204° C. to 218° C. By using this baking condition, a method of continuously producing strudels that contain cake, directly from the pastry dough and the raw cake dough, as the starting materials, was realized by the applicant.

Another object of this invention is to provide a method by which raw cake dough and a filling are continuously enveloped by a continuous pastry dough sheet to form a pastry dough body containing raw cake dough and a filling, and then cut and baked in a condition wherein the pastry dough is baked together with the raw cake dough and a filling, thereby obtaining strudels containing cake and a filling, while avoiding the excessive baking of cake dough pieces, due to their double baking, once before and once after, they are enveloped by pastry dough pieces, to produce stable and good quality strudel products, and to simplify the production process, thereby lowering production costs. The applicant conducted many experiments to find a condition to bake at one time the pastry dough together with the raw cake dough and a filling. As a result, it has been found that a preferable condition for baking is approximately the same as that for baking the pastry dough and the raw cake dough at one time. By using this baking condition, a method of continuously producing strudels that contain cake and a filling, directly from the pastry dough, the raw cake dough, and a filling, as the starting materials, was realized by the applicant.

In one aspect of this invention a method of continuously producing strudels containing cake is provided that comprises continuously extruding raw cake dough from a dough extruder onto the upper surface of a continuous pastry dough sheet being continuously conveyed, continuously enveloping said raw cake dough by the continuous pastry dough sheet, to form a pastry dough body containing raw cake dough, cutting said pastry dough body into pastry dough pieces containing raw cake dough, and baking said pastry dough pieces.

In another aspect of this invention a method of continuously producing strudels containing cake and a filling is provided that comprises continuously extruding raw cake dough from a dough extruder, and a filling from a filling extruder, onto the upper surface of a continuous pastry dough sheet being continuously conveyed, at a predetermined sequence, continuously enveloping said raw cake dough and said filling by the continuous pastry dough sheet to form a pastry dough body containing raw cake dough and a filling, cutting said pastry dough body into pastry dough pieces containing cake dough and a filling, and baking said pastry dough pieces.

The method of continuously producing strudels containing cake of this invention can continuously envelop raw cake dough by a continuous pastry dough sheet to form a continuous pastry dough body containing raw cake dough, and can then cut and bake it, and can thereby obtain strudels containing cake, while avoiding the excessive baking of the cake dough pieces, due to their double baking, once before and once after, they are enveloped by pastry dough pieces, to produce stable and good quality strudel products, and to lower production costs.

The method of continuously producing strudels containing cake and a filling of this invention can continuously envelop raw cake dough and a filling with a continuous pastry dough sheet to form a continuous pastry dough body containing raw cake dough and a filling, cut and bake it, thereby obtaining strudels containing cake and a filling, while avoiding the excessive baking of cake dough pieces, due to their double baking, once before and once after, they are enveloped by pastry dough pieces, to produce stable and good quality of strudel products, and to lower production costs.

PREFERRED EMBODIMENTS OF THE INVENTION

The first embodiment of the method of continuously producing strudels containing cake of this invention will now be described by reference to the drawings. The puff pastry dough and cake pastry dough for use in this embodiment are prepared by the following formulations:

| Puff pastry dough | |
|---|---|
| Strong flour | 45.2% by weight |
| Salt | 0.6 |
| Shortening | 2.2 |
| Water | 24.9 |
| Roll-in fats and oils | 27.1 |
| Total | 100 |
| Cake pastry dough | |
| Weak flour | 28.9% by weight |
| Sugar | 27.3 |
| Cake shortening | 4.0 |
| Corn starch | 2.0 |
| Egg | 20.0 |
| Salad oil | 14.4 |
| Baking powder | 1.3 |
| Dry milk | 1.7 |
| Salt | 0.4 |
| Total | 100 |

Figure 1:
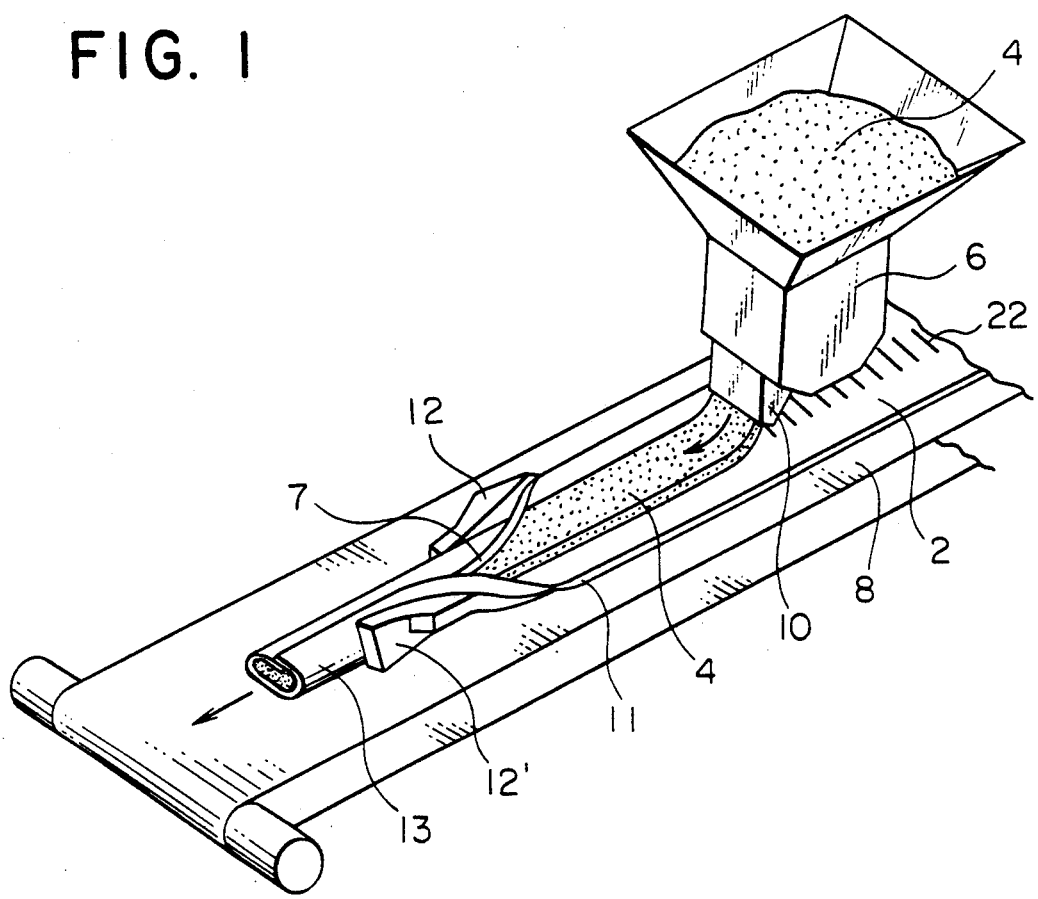
FIG. 1 is a schematic and perspective view illustrating the first embodiment of the method of continuously producing strudels containing cake of this invention.
Figure 4:
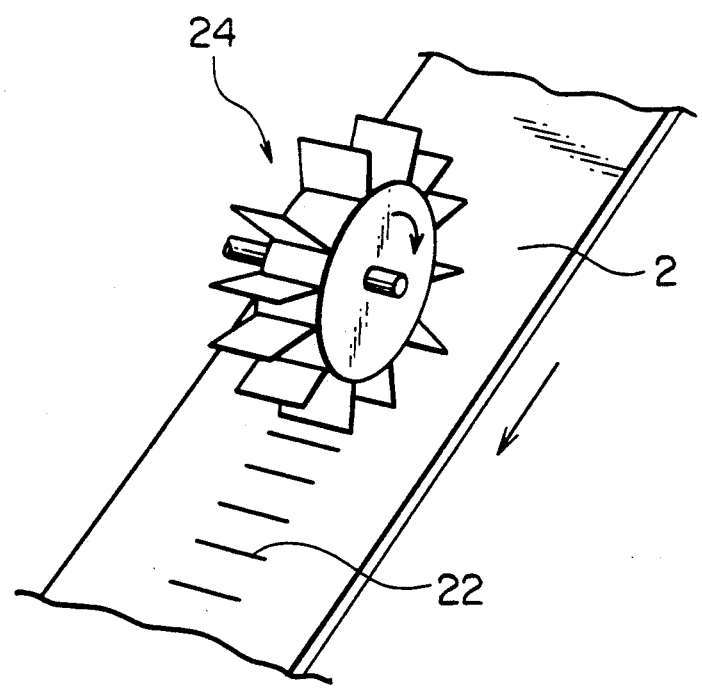
FIG. 4 is a view showing a blade wheel for stamping slits on the continuous pastry dough sheet of the first embodiment.

Puff pastry dough prepared by the above formulations is formed into a continuous sheet 2 by the apparatus disclosed in Japanese Patent Publication No. 52-20545, and fed by the belt 8 of a conveyor in a direction indicated by an arrow shown in FIG. 1. The raw cake dough 4 prepared according to these formulations is charged into an extruder 6 and continuously extruded from the nozzle 10 onto the surface of the continuous puff pastry dough sheet 2. A plurality of slits 22 is provided on the puff pastry dough sheet 22, which slits 22 are made by stamping the dough sheet by a blade wheel 24, shown in FIG. 4. The blade wheel 24 is adapted to rotate in a direction indicated by a curved arrow by a drive means (not shown), and each of its blades in turn stamps the dough sheet 2, while it is fed by the belt 8 in a direction indicated by an arrow. The slits 22 are somewhat open when the dough sheet 2 envelopes the raw cake dough, and the consumer can see the contents of the strudels through the thus formed slender openings. However, there have also been produced strudels which are provided with no slits, to meet consumer's preferences. Folders 12, 12' (known apparatus in the art) are mounted to the frame (not shown) of the conveyor such that the bottom surfaces thereof are in sliding contact with the surface of the belt 8. One edge 7 of the pastry dough sheet 2 is first folded toward the center of the puff pastry dough sheet by the folder 12, and then its other edge 11 is folded toward the center by the folder 12' to overlap the folded one edge 7 of the pastry dough sheet. Since before the edge 11 is folded the upper portion of the folded one edge 7 of the sheet 2 is wetted by water sprinkled from a sprinkler means (not shown) disposed above the conveyor, the edge 11 of the sheet 2 adheres to the one edge 7, so that the raw cake dough 4 is sealed by the continuous puff pastry dough sheet 2 when the other edge 11 is folded to overlap the one edge 7 of the sheet 2, whereby a continuous pastry dough body 13 containing raw cake dough is formed. The enveloped structure can be seen from the forward end of the body 13 in FIG. 1. The fluidity of the raw cake dough 4 should preferably be controlled such that it cannot flow out of the surface of the pastry dough sheet.

Figure 2:
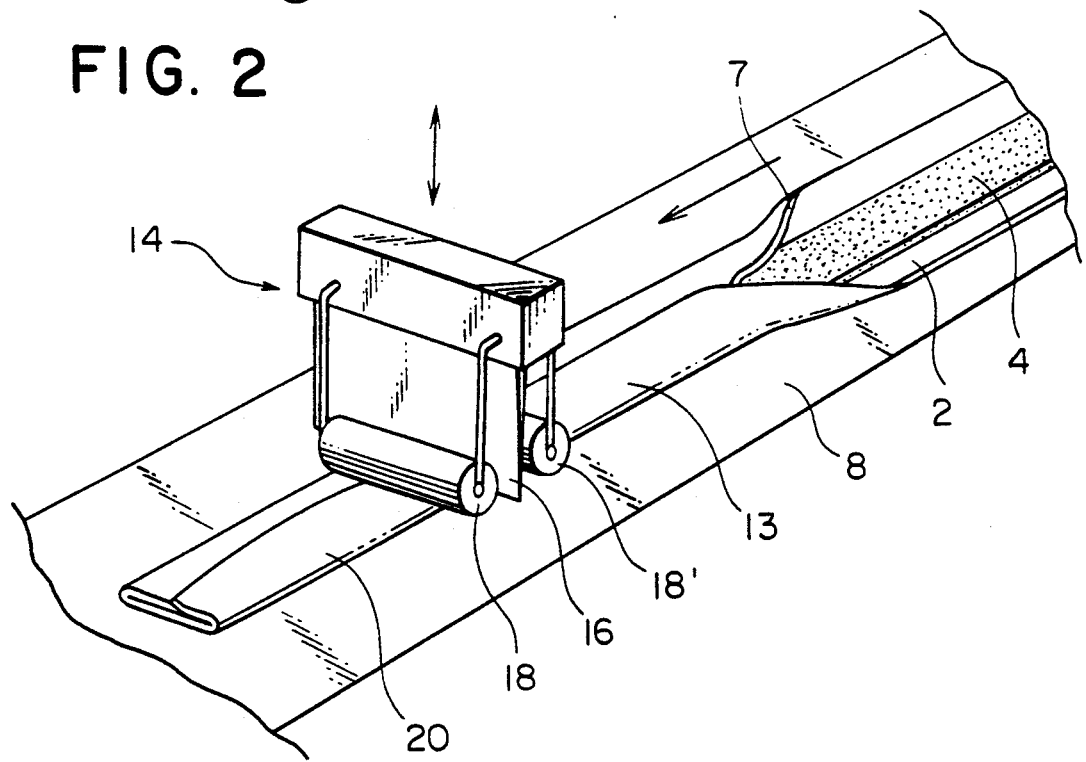
FIG. 2 is a view illustrating a cutter for cutting a continuous pastry dough body containing raw cake dough of the first embodiment.
Figure 3:
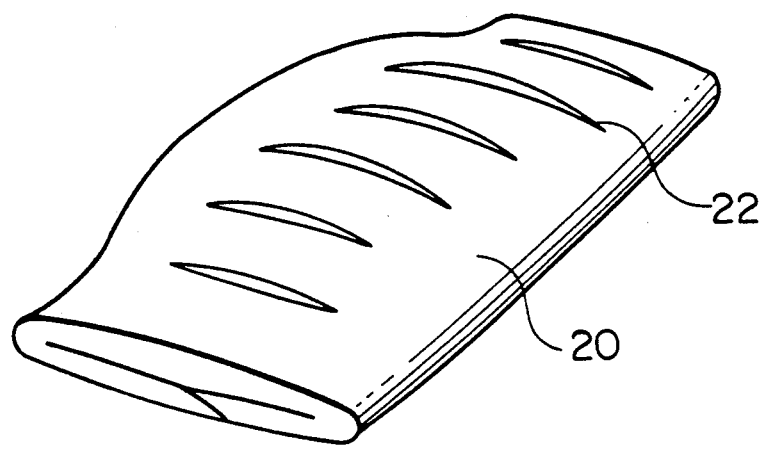
FIG. 3 is a view showing a pastry dough piece containing raw cake dough of the first embodiment.

The continuous pastry dough body 13 containing raw cake dough is then cut by a cutter 14 as shown in FIG. 2. The cutter 14 comprises a blade 16 and rollers 18, 18', mounted on the frame (not shown) of the conveyor, and can repeatedly move downwardly and upwardly to cut the continuous pastry dough body containing cake at intervals, while pressing and sealing the portions to be cut by the rollers 18, 18', thereby forming a pastry dough piece 20 containing raw cake dough. When this dough piece 20 in FIG. 2 is turned over, the pastry dough piece 20 containing raw cake dough as shown in FIG. 3 can be seen. Although both the forward end and the rearward end of the dough piece 20 are sealed by the rollers 18, 18', the continuous dough body 13 containing cake may be cut by a cutter provided with no rollers, to obtain a strudel that has ends exposing the contents. The body 20 is then baked for about 20 minutes at about 210° C. The baking time and baking temperature may range from 20 to 25 minutes and from about 204° C. to 218° C. In the prior art, as previously mentioned, a piece of raw cake dough is baked for about 45 minutes at about 177° C. (a first baking), and the baked cake is then enveloped by a piece of pastry dough to form a pastry dough piece containing the baked cake, and then it is baked for from about 25 to 35 minutes at a temperature ranging from about 177° C. to 190° C. (a second baking). Therefore, the total baking time of the cake dough is at least about 70 minutes (45 minutes, the first baking time plus at least 25 minutes, the second baking time, equals 70 minutes). In this invention, although the baking temperature is somewhat raised, the baking time is reduced to 20 to 25 minutes.

The prior art method of manually producing strudels containing cake comprises:

(1) preparing cake dough,
(2) baking the cake dough (the first baking),
(3) cutting the cake dough into a predetermined size,
(4) preparing the pastry dough,
(5) cutting the pastry dough into a predetermined size, (6) placing a piece of baked cake dough on a piece of pastry dough, (7) enveloping the piece of baked cake dough with the piece of pastry dough to form a pastry dough piece containing the baked cake, and (8) baking the pastry dough piece containing the baked cake (the second baking).

Thus, the cake dough is twice baked, and this results in lowering the quality of the cake due to the excessive baking. Namely, the weight of the cake dough is reduced, for example, by about 5% at the first baking, and about 2% at the second baking, due to the evaporation of volatile matters in the cake dough. The total 7% loss of the weight in the cake dough results in inferior products. Further, this method needs many steps, whereby the production time and costs are increased.

In contrast, the method of continuously producing strudels containing cake of this invention comprises:

(1) preparing raw cake dough, (2) preparing pastry dough, (3) extruding the cake dough and pastry dough from respective extruders to continuously envelope the raw cake dough with a pastry dough sheet to form a pastry dough body containing cake, and (4) baking the pastry dough body.

Thus, in the method of this invention the cake dough is baked at one time, and the process is much simplified, as compared with the method of the prior art. Further, since the baking is done only once, and the weight loss of the cake dough, for example, is about 2%, excessive baking is avoided, whereby good quality products are produced that have the desired fresh taste and moist feeling to meet the consumer's fondness. Further, decreasing the production time leads to saving heat energy needed for baking.

Also, the dough body 20 containing cake can be preserved for a desired period of time in a frozen condition and can then be baked, so that the consumer can obtain fresh strudels containing cake at any time.

The second embodiment of the method of continuously producing strudels containing cake of this invention will now be described by reference to FIGS. 5 and 6. The puff pastry dough and cake pastry dough for use in this embodiment are prepared by the same formulations as mentioned in the first embodiment.

Figure 5:
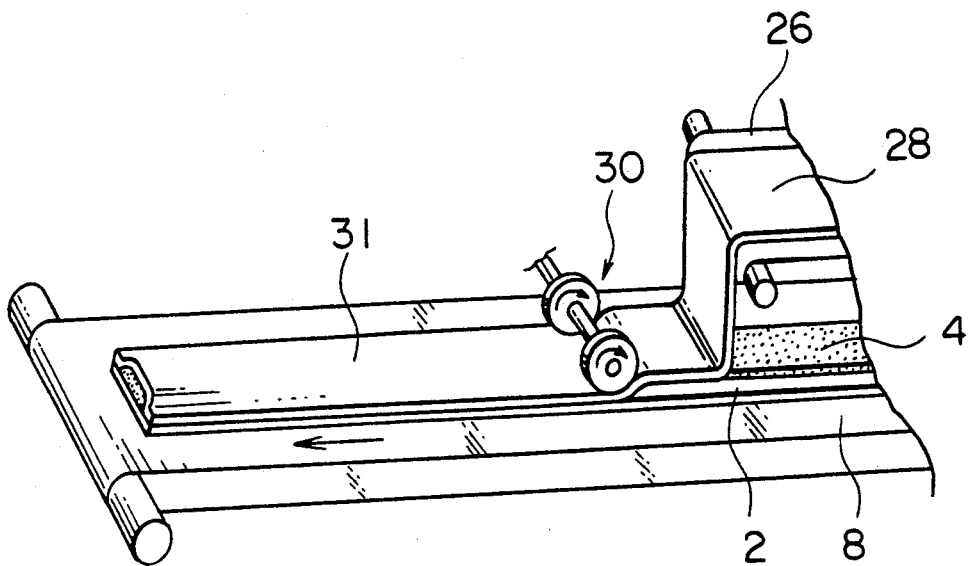
FIG. 5 is a schematic and perspective view illustrating a second embodiment.
Figure 6:
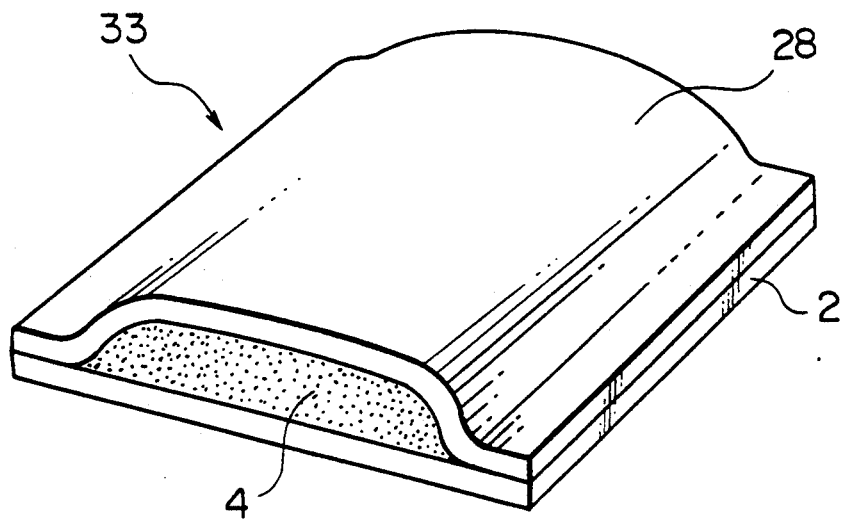
FIG. 6 is a perspective view showing a pastry dough piece containing raw cake dough of the second embodiment.

The puff pastry dough prepared is formed into a continuous sheet 2, and it is fed on the belt 8 of the conveyor, as shown in FIG. 5. The raw cake dough 4 prepared is charged into the extruder 6 and continuously extruded from the nozzle 10 onto the surface of the continuous puff pastry dough sheet 2. In this embodiment, in place of folding the edges of the continuous pastry dough sheet, a second continuous pastry dough sheet 28 is fed by the belt 26 of a conveyor (not shown) and overlapped onto the raw cake dough 4 and the first pastry dough sheet 2 as shown in FIG. 5. Both edges of the pastry dough sheet 2 are previously wetted by water from a sprinkler means (not shown), so that both edges of the second pastry dough sheet 28 adhere to both edges of the first pastry dough sheet 2 when pressed by a roller means 30, which is rotatable by a drive means (not shown), to form a continuous pastry dough body 31 containing raw cake dough. This body 31 is then cut by a cutter to form a pastry dough piece 33 containing raw cake dough as shown in FIG. 6. Since the cutter is provided just with a blade, the ends of the body 33 show the exposed cake dough 4. However, both ends of this body 33 may also be sealed by using the cutter 14 of the form, as in the first embodiment. This body 33 is then baked to form a strudel, or frozen to preserve it for a desired period of time.

Figure 7:
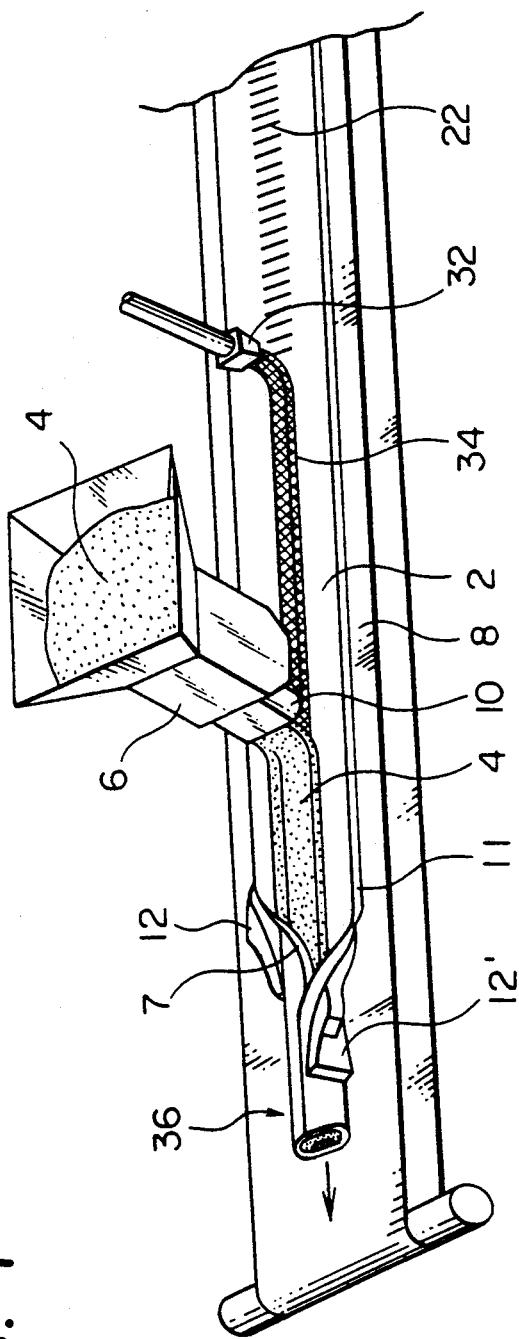
FIG. 7 is a schematic and perspective view illustrating an embodiment of the method of continuously producing strudels containing cake and a filling of this invention.
Figure 8:
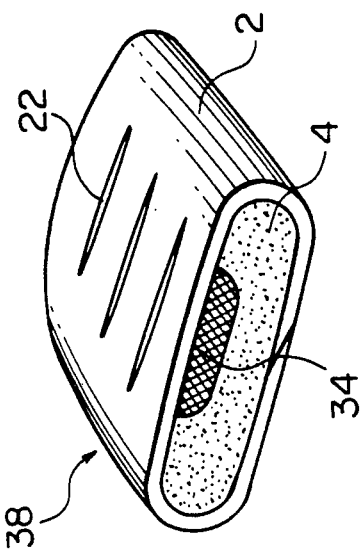
FIG. 8 is a view showing a pastry dough piece containing raw cake dough and filling of the embodiment of FIG. 7.

An embodiment of the method of continuously producing strudels containing cake and a filling of this invention will now be described by reference to FIGS. 7 and 8. In FIG. 7 the continous puff pastry dough sheet 2 provided with a plurality of slits 22 made by the blade wheel 24 is fed by the belt 8 of the conveyor. A chocolate cream filling is continuously extruded from the nozzle 32 of an extruder (not shown) onto the surface of the pastry dough sheet 2. Onto the chocolate cream 34 and pastry dough sheet 2 is extruded the raw cake dough 4 from the nozzle 10 of the extruder 6. One edge 7 of the pastry dough sheet 2 is then folded toward the center of the sheet 2 by the folder 12, water from a sprinkler means (not shown) is sprinkled onto the uppeer portion of the folded one edge 7 of the pastry sheet 2, and the other edge 11 of the pastry dough sheet 2 is folded toward the center of the dough sheet 2 by the folder 12', whereby the the other edge 11 of the sheet 2 adheres to the upper portion of the one edge 7 thereof to envelope the raw cake dough 4 and the chocolate cream 34 with the pastry dough sheet 2 to form a continuous pastry dough body 36 containing raw cake dough and a filling. This body 36 is then cut by a cutter to form a pastry dough piece 38 containing raw cake dough and a filling as shown in FIG. 8. This dough piece 38 also shows an end with the exposed filling 34 and cake dough 4. Both ends of the body 38 may also be sealed, as in the previous embodiment. This body is then baked for about 22 minutes at about 215° C. to form a strudel containing cake and chocolate cream. This body can also be frozen to preserve it for a desired period so as to meet the immediate needs of a consumer, who can then bake the frozen strudel dough body. Although in this embodiment the chocolate cream filling is first extruded onto the surface of the pastry dough sheet, and then the raw cake dough is extruded onto the filling, the raw cake dough can first be extruded, and then the chocolate cream can be extruded. Further, in place of folding the edges of the pastry dough sheet to envelop the cake and filling, it is also possible to overlap the cake and filling by a continuous pastry dough sheet other than the continuous pastry dough sheet onto which the cake and filling are extruded. In this case, the pastry dough sheet for overlapping is supplied as shown in FIG. 5

Although in these embodiments of this invention puff pastry dough and chocolate cream are used, Danish pastry dough, or croissant dough, or any other suitable dough, can be used for the pastry dough, and apple jam and various other fillings can be used.

As described above, the method of continuously producing the strudels containing cake of this invention can, by a simplified process and at low production costs, continuously envelope raw cake dough to form a continuous pastry dough body containing cake, which body is then cut turn baked to form strudels containing cake of a stable and good quality. These merits are due to the continuous process of this invention, in which the raw cake dough is continuously enveloped by a pastry dough sheet, and they are baked at the same time to avoid the excessive baking, thereby assuring strudels containing properly baked cake, and saving the production time and heat energy for needed baking. Further, the method of continuously producing strudels containing cake and a filling of this invention can, by its simplified process and at low production costs, continuously envelope the raw cake dough and filling to form a continuous pastry dough body containing cake and a filling, which body is then cut into pastry dough pieces containing the raw cake dough and filling, which are in turn baked to form strudels containing cake and a filling of a stable and good quality. Therefore, according to this invention, strudels containing cake, or cake and a filling, with a high quality, can be continuously produced at low production costs, to thereby meet the consumer's needs.

I claim:

1. A method of continuously producing strudels containing cake, comprising continuously extruding raw cake dough from a dough extruder onto the upper surface of a continuous pastry dough sheet being continuously conveyed, continuously enveloping said raw cake dough by the continuous pastry dough sheet to form a pastry dough body containing raw cake dough, and baking said pastry dough body only once while holding the temperature substantially constant during said baking.

2. The method of claim 1, in which said continuous pastry dough sheet onto which said raw cake dough is extruded is continuously folded to envelop said raw cake dough.

3. The method of claim 1, in which a continuous pastry dough sheet other than said continuous pastry dough sheet onto which said raw cake dough is extruded is overlapped onto said raw cake dough to envelop it.

4. The method of claim 1, in which said pastry dough body is baked for from about 20 to 25 minutes at a temperature ranging from about 204° C. to 218° C.

5. A method of continuously producing strudels containing cake and a filling, said method comprising continuously extruding raw cake dough from a dough extruder, and a filling from a filling extruder, onto the upper surface of a continuously pastry dough sheet being continuously conveyed, at a predetermined sequence, continuously enveloping said raw cake dough and said filling by the continuous pastry dough sheet to form a pastry dough body containing raw cake dough and a filling, and baking said pastry dough body only once while holding the temperature substantially constant during said baking.

6. The method of claim 5, in which said sequence is such that said raw cake dough is first extruded and then said filling is extruded onto said raw cake dough.

7. The method of claim 6, in which said continuous pastry dough sheet onto which said raw cake dough and said filling are extruded is continuously folded to envelop said raw cake dough and said filling.

8. The method of claim 6, in which a continuous pastry dough sheet other than said continuous pastry dough sheet onto which said raw cake dough and said filling are extruded is overlapped onto said raw cake dough and said filling to envelop them.

9. The method of claim 5, in which said sequence is such that said filling is first extruded and then said raw cake dough is extruded onto said filling.

10. The method of claim 9, in which said continuous pastry dough sheet onto which said raw cake dough and said filling are extruded is continuously folded to envelop said raw cake dough and said filling.

11. The method of claim 9, in which a continuous pastry dough sheet other than said continuous pastry dough sheet onto which said raw cake dough and said filling are extruded is overlapped onto said raw cake dough and said filling to envelop them.

12. The method of claim 5, in which said pastry dough body is baked for from about 20 to 25 minutes at a temperature ranging from about 204° C. to 218° C.

13. The method of claim 1, 2, 3, 5, 6, 9, 7, 8, 4, 12, 10, or 11, in which said pastry dough body is preserved in a frozen condition, after the formation thereof and before being baked.

14. The method of claim 1, 2, 3, 5, 6, 9, 7, 8, 4, 12, 10, or 11, in which said continuous pastry dough sheet is a continuous puff pastry dough sheet.

15. The method of claim 1, 2, 3, 5, 6, 9, 7, 8, 4, 12, 10, or 11, in which said continuous pastry dough sheet is a continuous Danish pastry dough sheet.

16. The method of claim 1, 2, 3, 5, 6, 9, 7, 8, 4, 12, 10, or 11, in which said continuous pastry dough sheet is a continuous croissant dough sheet.

* * * * *

UNITED STATES PATENT AND TRADEMARK OFFICE
CERTIFICATE OF CORRECTION

PATENT NO. : 5,112,631
DATED : MAY 12, 1992
INVENTOR(S) : YASUHIRO NAKAMURA

It is certified that error appears in the above-identified patent and that said Letters Patent is hereby corrected as shown below:

Claim 5, column 7, line 39, change "continuously" to --continuous--.

Signed and Sealed this

Sixth Day of July, 1993

Attest:

MICHAEL K. KIRK

Attesting Officer

Acting Commissioner of Patents and Trademarks